C. J. PETERSON.
RUNNER ATTACHMENT.
APPLICATION FILED FEB. 25, 1920.

1,375,727. Patented Apr. 26, 1921.

Inventor
C. J. Peterson.

By _____, Attorneys

UNITED STATES PATENT OFFICE.

CARL J. PETERSON, OF ELDRIDGE, NORTH DAKOTA.

RUNNER ATTACHMENT.

1,375,727.

Specification of Letters Patent. Patented Apr. 26, 1921.

Application filed February 25, 1920. Serial No. 361,115.

*To all whom it may concern:*

Be it known that I, CARL J. PETERSON, a citizen of the United States, residing at Eldridge, in the county of Stutsman and State of North Dakota, have invented certain new and useful Improvements in Runner Attachments, of which the following is a specification.

This invention relates to improvements in runner attachments for vehicles.

An important object of this invention is to provide novel means whereby a plurality of runners may be readily and conveniently substituted for the wheels of a vehicle during the snow season.

A further object of this invention is to provide a runner attachment for vehicles provided with novel means for connecting the runners to the axles of the vehicles to permit of the runners partaking of a limited rocking movement due to encountering inequalities in the road during travel.

The invention also aims to provide a runner attachment for vehicles which is simple to apply, desirable in use and cheap to manufacture.

Other objects and advantages of the invention will be apparent during the course of the following description.

Figure 1:
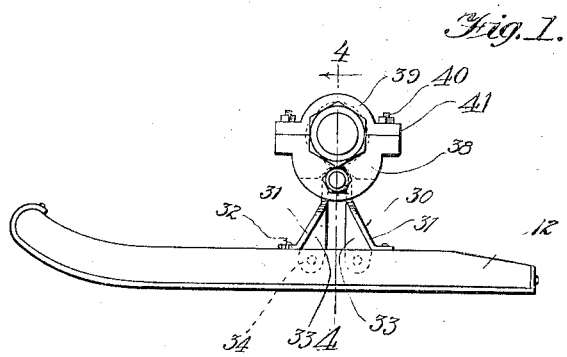
Figure 2:
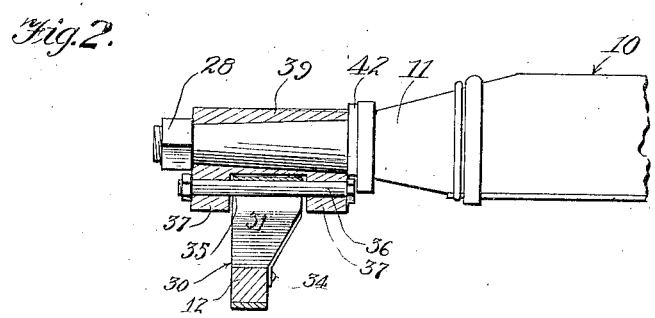

In the accompanying drawings forming a part of this application and in which like numerals are employed to designate like parts throughout the same, Figure 1 is a side elevation of a modified form of the invention applied, Fig. 2 is a vertical transverse section taken on line 4—4 of Fig. 1.

In the drawings the numeral 10 generally designates the axle of a vehicle which may for the purpose of this specification be horse-drawn. The end portions of the axle are provided with skeins 11 over which the hubs of the wheels of the vehicle ordinarily fit.

The invention forming the subject matter of this application aims to provide novel means whereby a runner 12 may be detachably secured to the skeins 11 in such a manner as to permit of the rocking movement of the runner when the latter encounters inequalities in the roadway.

A knee 30 is mounted upon the runner 12 and is formed from a flat length of metal bent intermediate its ends to provide a pair of diverging attaching arms 31 secured at their lower ends to the runner by suitable attaching means 32. The length of metal from which the knee 30 is formed is bent inwardly from one of the longitudinal sides of the arms 31 to form vertically arranged spaced parallel attaching arms 33 secured to the inner vertical side of the runner, as indicated at 34. The upper portion of the knee 30 is arranged in U-shaped formation to form a transverse bearing opening 35 adapted to receive a transversely extending pivot bolt 36. With particular reference to Fig. 2, it will be observed that the pivot bolt 36 is extended through a pair of spaced depending ears 37 having alined openings through which the end portions of the bolt 36 extend. The apertured ears 37 are carried by the lower portion 38 of a two-part journal adapted to receive the skein. A cap 39 is mounted upon the lower portion of the journal and is secured to the same by bolts 40 extended through a pair of lateral projections 41. The opposed sides of the lower portion 38 and the cap 39 are provided with registering semi-circular channels or grooves which form a cylindrical opening for receiving the skein 11. An annular shoulder 42 formed on the skein is engaged by the inner side of the journal when the skein is forced into position by threading the bolt 28 onto the skein.

With particular reference to Fig. 2, it will be noted that a double-jointed connection is provided between the runner 12 and the skein 11 which permits the runner to readily conform to irregularities in the road.

Having thus described the invention, what I claim is:

A runner attachment for the axles of wheeled vehicles consisting of a runner, upper and lower bearing members constructed to rotatably receive the axle between them, the lower member being provided at its ends with depending ears, means for securing the bearing members together about the axle, a knee consisting of spaced vertical arms secured rigidly to the runner at their lower ends and having an arched connection between their upper ends fitting between the ears depending from the lower bearing member, a pivot inserted through said ears and the arched connection of the knee, and means on the end of said pivot engaging the ears exteriorly to secure the pivot against endwise movement.

In testimony whereof I affix my signature.

CARL J. PETERSON. [L. S.]